United States Patent
Rieger

(10) Patent No.: US 6,274,862 B1
(45) Date of Patent: Aug. 14, 2001

(54) ARRANGEMENT FOR DETERMINING THE INCIDENCE ANGLE OF RADIATION AND ESPECIALLY SOLAR RADIATION

(75) Inventor: Rolf Rieger, Ebersberg (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/211,847

(22) Filed: Dec. 15, 1998

(30) Foreign Application Priority Data

Aug. 25, 1998 (DE) .............................................. 198 38 460

(51) Int. Cl.⁷ ....................................................... H01J 3/14
(52) U.S. Cl. .................. 250/216; 250/237 R; 250/203.4; 356/139.02
(58) Field of Search ................................. 250/216, 203.1, 250/203.2, 203.3, 203.4, 206.1, 206.2, 237 R; 356/141.5, 139.03, 139.02

(56) References Cited

U.S. PATENT DOCUMENTS

| | | |
|---|---|---|
| 3,951,550 | 4/1976 | Slick . |
| 4,018,532 | 4/1977 | Fletcher et al. ................... 356/139.02 |
| 4,445,030 | 4/1984 | Carlton .............................. 250/203.4 |
| 4,794,245 | 12/1988 | Auer . |
| 4,999,483 | 3/1991 | Okamoto . |
| 5,264,691 | 11/1993 | Hegyi . |
| 5,264,910 | 11/1993 | Hill . |
| 5,483,060 * | 1/1996 | Sugiura et al. ................... 250/237 R |

FOREIGN PATENT DOCUMENTS

| | | |
|---|---|---|
| 2742247 | 3/1979 | (DE) . |
| 4122707 | 2/1992 | (DE) . |

\* cited by examiner

*Primary Examiner*—Que T. Le
*Assistant Examiner*—Thanh X Luu
(74) *Attorney, Agent, or Firm*—W. F. Fasse; W. G. Fasse

(57) ABSTRACT

A device for determining the angle of incidence ($\alpha$) of incident radiation and particularly sunlight (S) includes an array of light sensitive elements (10, 11 and 12) and a shadow mask (15) arranged above the elements. The shadow mask (15) includes a transparent region (14) and a non-transparent region (13) with a linear boundary or edge (16) therebetween. The linear edge (16) is arranged above the center of the linear array (9) of light sensitive elements (10, 11 and 12) so as to extend at a right angle relative to the linear direction of the array. To determine the angle of incidence ($\alpha$), a coarse determination of the number of completely shaded light sensitive elements (10), and a fine determination of the fractional shading portion of the partially shaded light sensitive element (11) immediately adjacent to the completely shaded elements, are carried out. In this manner, a very high precision and accuracy can be achieved, exceeding the physical resolution determined by the size of the individual light sensitive elements, while still maintaining a simple and reliable construction. The angles of incidence ($\alpha$) and ($\beta$) in two perpendicular planes can be determined by providing a two-dimensional array of light sensitive elements in connection with a shadow mask having a two-dimensional checkerboard pattern of transparent regions and non-transparent regions.

28 Claims, 2 Drawing Sheets

ARRANGEMENT FOR DETERMINING THE INCIDENCE ANGLE OF RADIATION AND ESPECIALLY SOLAR RADIATION

PRIORITY CLAIM

This application is based on and claims the priority under 35 U.S.C. §119 of German Patent Application 198 38 460.2, filed on Aug. 25, 1998, the entire disclosure of which is incorporated herein by reference.

FIELD OF THE INVENTION

The invention relates to an arrangement for determining the angle of incidence of radiation from a radiation source, and especially of solar radiation from the sun. The invention particularly relates to a system including a sun sensor.

BACKGROUND INFORMATION

Systems including one or more sun sensors for determining the angle of incidence of solar radiation are used for orienting satellites or solar generators mounted thereon relative to the sun, among other applications. According to a basic principle of one type of such sun sensor system, the system includes an arrangement of a plurality of light sensitive elements, i.e. a photosensitive detector array, and a shadow mask having a transparent region and an opaque or non-transparent region arranged at a certain spacing in front of the photosensitive elements, in the radiation beam path of the radiation source, and particularly the sun. One or more of the photosensitive elements are thereby shadowed or shaded by the shadow mask, dependent on the particular angle of incidence of the solar radiation. By evaluating the output signals provided by the photosensitive elements, the system generates a final output signal corresponding to the angle of incidence of the solar radiation, i.e. the angle of the sun relative to the sun sensor.

As an example, one type of known sun sensor has a shadow mask configured as a slit diaphragm or aperture, whereby the approximately parallel sunlight passes through the slit aperture onto the photodetector array. In such an arrangement, the position of the projection of the slit aperture, i.e. the position at which the line of sunlight passing through the slit aperture falls onto the photosensitive elements, will vary depending on the solar incidence angle. As a result, the location at which a photocurrent is generated on the photodetector array will also vary, and can thus be evaluated to determine the solar incidence angle.

U.S. Pat. No. 4,999,483 (Okamoto) discloses a sun sensor in which the photodetector array is a linear array or arrangement of a plurality of light sensitive elements, and particularly a plurality of photodiodes, arranged one after another along a line in a first linear direction. A shielding element or shadow mask arranged at a spacing in front of the arrangement of light sensitive elements has an opening in the shape of a triangle therein, whereby one side edge of the triangle extends perpendicularly to the first linear direction, another side edge is oriented at a sloping angle relative to the first side edge, and the third side edge interconnects the two above-mentioned side edges and extends parallel to the first linear direction. With this arrangement, the incident sunlight passing through the triangular opening falls on and illuminates a plurality of the photodiodes in an illuminated region bounded by the second and third side edges of the triangular opening. The position of the group of illuminated photodiodes along the linear photodetector array is dependent on the angle of incidence of the sunlight in a plane parallel to the first linear direction, while the number of illuminated photodiodes is dependent on the angle of incidence of the sunlight in a plane perpendicular to the first linear direction. The entirety of the disclosure of U.S. Pat. No. 4,999,483 is incorporated herein by reference, because a person of ordinary skill will recognize that some of the components of the system disclosed therein can be used in the present inventive system as well.

U.S. Pat. No. 5,264,691 (Hegyi) discloses a system including a photosensor that comprises an arrangement or array of four quadrilateral light sensitive elements of equal size or surface area and a shadow mask arranged at a spacing in front of the light sensitive elements in the light beam path of the light source. The shadow mask has a quadrilateral opening therein, of which the side edges respectively extend parallel to the side edges of the array of light sensitive elements. Thus, when sunlight falls on the photosensor in a normal direction, i.e. perpendicularly in two dimensions, then the light passes through the quadrilateral opening in the shadow mask and falls uniformly onto each one of the light sensitive elements of the photodetector array. In this situation, each one of the light sensitive elements outputs an equivalent photocurrent. When the angle of incidence of the sunlight changes, the projected image of the quadrilateral opening of the shadow mask will correspondingly move across the photodetector array, whereby at least a portion of one or more of the light sensitive elements will become shaded, and accordingly this particular light sensitive element will output a reduced photocurrent. With this arrangement, the angle of incidence of the sunlight in two directions relative to the photodetector array can be determined by evaluating the ratios or relationships of the respective photocurrent levels output by the respective light sensitive elements. The entirety of the disclosure of U.S. Pat. No. 5,264,691 is incorporated herein by reference, because a person of ordinary skill will recognize that some of the components of the system disclosed therein can be used in the present inventive system as well.

The known sun sensor arrangements, including those described above, suffer several disadvantages. Foremost is a lack of sufficient precision in the determination of the incidence angle. Generally, the precision of the determination is limited by the effective pixel size of the light sensitive elements. Alternatively, complex structural arrangements or complex circuit arrangements are necessary for achieving a greater precision. Such arrangements are more expensive and complicated to manufacture, and more difficult and complicated to operate reliably.

SUMMARY OF THE INVENTION

In view of the above, it is an object of the present invention to provide an arrangement or system for determining the angle of incidence of radiation, and particularly sunlight radiated from the sun, whereby the arrangement has a simple construction and achieves a high accuracy and precision in determining the radiation incidence angle in one or two directions. Another object is to provide a particular method of carrying out the angle determination. The invention further aims to avoid or overcome the disadvantages of the prior art, and to achieve additional advantages, as apparent from the present description.

The above objects have been achieved in a first arrangement for determining the angle of incidence of optical radiation from a light source and particularly the sun, according to the invention. The arrangement includes an array of a plurality of light sensitive elements arranged one after another in a first linear direction, and a shadow mask arranged in the light beam path of the light source at a spacing in front of the light sensitive elements. The shadow mask includes a transparent region or area and a non-transparent or opaque region or area. The light sensitive elements are shaded by the shadow mask, to a varying extent dependent on the angle of incidence of the incident radiation, and accordingly an output signal corresponding to the angle of incidence is generated.

Further according to the invention, the transparent region and the non-transparent region of the shadow mask are respectively bounded or separated from one another by a linear boundary or edge that is positioned in front of the center of the photosensitive array of light sensitive elements and extends at a right angle relative to the first linear direction. When radiation, and especially sunlight, illuminates this arrangement, the linear boundary of the shadow mask separating the transparent region from the non-transparent region forms a corresponding shadow boundary between a shaded region projected onto the array under the non-transparent region and an illuminated region projected onto the array under the transparent region. Thus, the light sensitive elements lying in the shaded region are shaded by the non-transparent region of the shadow mask, while the other light sensitive elements lying in the illuminated region are illuminated by the sunlight projecting through the transparent region of the shadow mask.

The arrangement according to the invention further includes first means for receiving the output signals of the light sensitive elements, and therefrom determining the number of light sensitive elements that are completely within the shaded region, and the fractional shaded portion of a respective light sensitive element that is directly adjacent the completely shaded light sensitive elements and that is partially in the shaded region and partially in the illuminated region. The arrangement further comprises second means for determining the angle of incidence of the incident radiation based on the output information provided by the above mentioned first means.

The arrangement according to the invention achieves at least the following advantages: a very simple construction, a small size, a low weight, a low manufacturing cost, and a very high reliability in operation. Even with the above mentioned simple, economical and reliable structure, the inventive arrangement achieves a very high accuracy and precision in the incidence angle determination, because the inventive arrangement makes it possible to carry out a first coarse determination and a second fine determination of the incidence angle. Namely, the coarse determination of the incidence angle is provided by determining the number of fully shaded light sensitive elements, while the fine determination of the incidence angle is provided by determining the fractional shaded portion of the particular light sensitive element that is partially shaded, i.e. the light sensitive element that is bisected or crossed by the shadow boundary. In this manner, the precision of the angle determination can be much greater than that afforded by the physical pixel size of the light sensitive elements.

For a particularly simple structure and operation, the light sensitive elements are preferably arranged one after another in a linear array in a single row or line extending along the first linear direction. Moreover, the light sensitive elements are preferably each respectively quadrilateral in shape. It is most advantageous if the successive light sensitive elements are arranged directly contiguously, one next to the other along the first linear direction, in order to achieve the highest precision.

It is also particularly advantageous if all of the light sensitive elements are integrally formed as a monolithic linear detector array. In this manner, the detector array can be realized with a small size, a low weight, and a low manufacturing cost.

In order to further simplify the construction and thereby make the arrangement more economical, the number n of light sensitive elements is equal to eight or a whole multiple of eight. In this manner, it is possible to use standard electronic components such as eight-fold multiplexers or four-fold operational amplifiers.

According to a further embodiment, the inventive arrangement includes two of the above described arrangements oriented parallel to each other. Namely, this arrangement includes two of the above described linear arrays of light sensitive elements arranged parallel next to each other and extending along the first linear direction, and may include a common shadow mask shared by both arrays. The respective output signals of these two linear arrays are processed independently of one another, in order to provide a redundancy, which is especially advantageous for applications in spacecraft for safety and reliability reasons.

Yet another embodiment of the inventive arrangement includes two linear arrays of light sensitive elements that respectively extend along two mutually perpendicular linear directions. A respective shadow mask is provided for each one of the linear arrays, whereby each shadow mask includes a transparent region and a non-transparent region with a boundary or edge therebetween extending perpendicularly to the associated linear array. Thus, the two boundaries or edges of the non-transparent portions of the two shadow masks extend perpendicularly relative to each other. In this manner, it is possible to determine the angle of incidence of the incident radiation in two mutually perpendicular directions. Particularly, an arrangement according to this embodiment makes it possible to determine the angle of incidence of sunlight in a plane parallel to the first linear direction of the first linear array, and in a plane parallel to the second linear direction of the second linear array.

For carrying out the determination of the fractional shaded portion of the partially shaded light sensitive element, the first means are preferably further adapted to receive the respective output signals of the fully illuminated light sensitive element and the fully shaded light sensitive element that are respectively immediately neighboring or adjacent to the partially shaded light sensitive element. It is particularly advantageous if the first means include means for determining the dark current based on the output signal of the neighboring completely shaded light sensitive element, for then carrying out a dark current correction of the output signal of the partially shaded light sensitive element.

A second aspect of the invention provides an arrangement that includes all of the above discussed features, but uses a two-dimensional array of light sensitive elements arranged and extending next to one another in a first linear direction and in a second linear direction, rather than the above discussed linear array having light sensitive elements linearly extending in only one direction. According to this second aspect of the invention, the shadow mask has respective transparent quadrants and non-transparent quadrants that are alternately arranged in two directions in a checkerboard fashion. The boundaries or edges of the respective non-transparent quadrants bordering on the transparent quadrants thus form two intersecting boundary lines extending perpendicularly to each other and perpendicularly to the first and second linear directions in which the rows and columns of light sensitive elements extend. The point of intersection of these two boundary lines is located essentially over the center of the two-dimensional array of light sensitive elements.

This arrangement according to the second aspect of the invention includes first means for receiving the output signals of the light sensitive elements and then determining the number and position of the light sensitive elements that are completely within a shaded region that is shaded by the respective non-transparent quadrants of the shadow mask. The first means further determines the fractional shaded portion as well as the position of the light sensitive elements that border on the completely shaded elements and lie directly on the shadow boundary projected from the boundary lines between the non-transparent quadrants and the transparent quadrants of the shadow mask. The arrangement further includes second means for determining the angle of incidence of the incident radiation in two dimensions or two directions, using the output information provided by the first means.

An essential additional advantage achieved by this arrangement according to the second aspect of the invention is that a single photodetector array can be used for determining the angle of incidence in two perpendicular directions, with a high degree of precision. This high precision is achieved because the determination is carried out first on a coarse basis by determining the number and position of the completely shaded light sensitive elements, and secondly on a fine basis by determining the fractional shaded portion of the respective partially shaded light sensitive elements. By these means, the invention achieves a precision that is much greater than the precision that is provided by the physical size of the light sensitive elements, i.e. the physical pixel size of the photodetector array.

All of the above discussed advantages and preferential embodiment features relating to the first aspect of the invention also apply to the second aspect of the invention, and are merely extended to apply to the second direction or second dimension of the photodetector array. For example, in the second aspect of the invention, the light sensitive elements are preferably arranged as a two-dimensional grid array extending along first and second perpendicular directions in a flat plane, whereby each light sensitive element preferably has a quadrilateral shape, and particularly a square shape. The light sensitive elements are preferably arranged directly adjacent and contiguous with one another in the first direction and/or in the second direction. It is especially advantageous if the light sensitive elements are all integrally embodied in a single monolithic detector array. The respective number m, n of light sensitive elements in the first linear direction and in the second linear direction is respectively preferably equal to eight or a whole multiple of eight, for the reasons discussed above.

As also discussed above in connection with the first aspect of the invention, the first means are further adapted to receive the output signals of one or more of the neighboring fully illuminated light sensitive elements and one or more neighboring fully shaded light sensitive elements, directly adjacent to a respective partially shaded light sensitive element. Particularly, the first means are adapted to carry out a dark current correction of the output signal of the partially shaded light sensitive element based on dark current information received from a neighboring completely shaded light sensitive element.

In both of the above described aspects of the invention, the first means could alternatively determine the number of fully illuminated light sensitive elements instead of the number of fully shaded elements. These two determinations are considered to be equivalent, and the resulting information of either type can be equivalently used, with minor calculation adjustments, by the second means for determining the angle of incidence. Also, in circumstances in which the shadow boundary falls exactly between two adjacent light sensitive elements, so that there is not truly a partially shaded element, the arrangement and method of the invention may simply designate as the "partially shaded element" a respective fully illuminated or fully shaded element located directly between a contiguous group of fully shaded elements and a contiguous group of fully illuminated elements. In that case, the fractional shading portion is determined to be 0% if a fully illuminated element is used as the "partially shaded element", or 100% if a fully shaded element is used as the "partially shaded element". As a further alternative, the determination of the fractional shading portion can be omitted if it is determined that all of the elements have output signals qualifying as fully shaded or fully illuminated elements, in which case the angle determination can proceed based solely on the number of fully shaded elements (or equivalently based on the number of fully illuminated elements).

BRIEF DESCRIPTION OF THE DRAWINGS

In order that the invention may be clearly understood, it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figure 1:
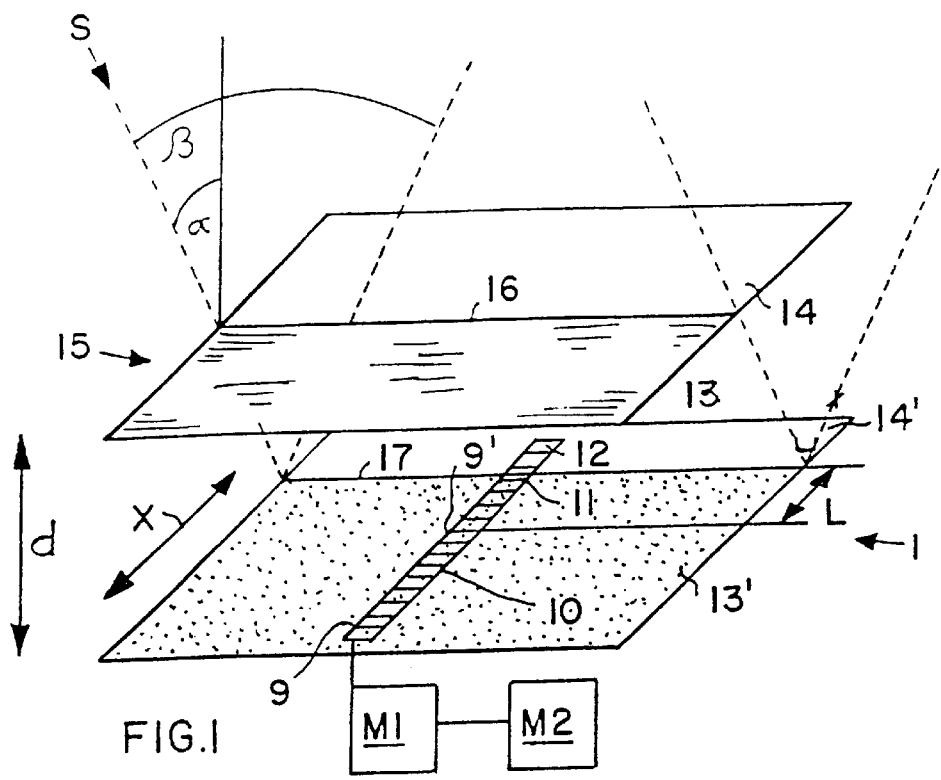
FIG. 1 is a schematic perspective view of an arrangement for determining the angle of incidence of incident radiation, embodied as a sun sensor according to a first example of the invention.

FIG. 1 schematically shows a device 1 for determining the incidence angle $\alpha$ of incident radiation, and particularly solar radiation S from the sun. Thus, the device 1 is particularly a sun sensor 1 in this example. The sun sensor 1 comprises a one-dimensional or linear photosensor array 9 including a plurality of light sensitive elements 10, 11 and 12 arranged linearly one after another extending along a first linear direction X. A center of the linear array 9 is designated as 9'. The linear photosensitive array 9 is embodied as a single monolithic detector array, wherein the individual light sensitive elements 10, 11 and 12 are each rectangular or quadrilateral and arranged immediately contiguous with one another. In the present example, the array 9 includes a total of sixteen light sensitive elements 10, 11 and 12, whereby thirteen of the elements 10 are completely shaded, one element 11 is partially shaded, and two of the elements 12 are completely illuminated by the incident sunlight, as will be described in greater detail below.

The sun sensor 1 further includes a shadow mask 15 arranged at a spacing d above or in front of the light sensitive elements 10, 11 and 12. The shadow mask 15 includes a transparent region 14 and a non-transparent or opaque region 13, with a linear boundary or edge 16 extending therebetween. The shadow mask 15 may be embodied as a transparent plate, such as a glass cover plate 15' or the like, with a first portion thereof maintained transparent to form the transparent region 14, and with a non-transparent film 15" arranged on a second portion thereof to form the non-transparent region 13. The linear boundary or edge 16 of the non-transparent region 13 bordering the transparent region 14 extends perpendicularly to the first linear direction X, and is arranged directly over the center 9' of the linear array 9 of light sensitive elements 10, 11 and 12. Thus, the boundary or edge 16 divides the shadow mask 15 essentially in half, namely such that the transparent region 14 occupies half of the shadow mask 15 and the non-transparent region 13 occupies the other half of the shadow mask 15. It should be noted that the non-transparent region does not necessarily have to be entirely opaque, but rather only to have a distinguishably lower transparency than the transparent region. Since a dark current correction is carried out, as will be discussed below, some light transmission through the non-transparent region will not disrupt or detract from the proper operation of the arrangement.

When sunlight S impinges on the sun sensor 1, at an incidence angle α relative to the normal of the photosensitive array, the sunlight is blocked by the non-transparent region 13 of the shadow mask 15, but allowed to pass through the transparent region 14. Thereby, the sunlight S passing through the transparent region 14 projects an illuminated region 14' onto the linear array 9, while the non-transparent region 13 projects or casts a shaded region 13' onto the linear array 9, whereby the linear boundary or edge 16 of the shadow mask 15 projects a shadow boundary 17 onto the linear array 9.

Figure 2A:
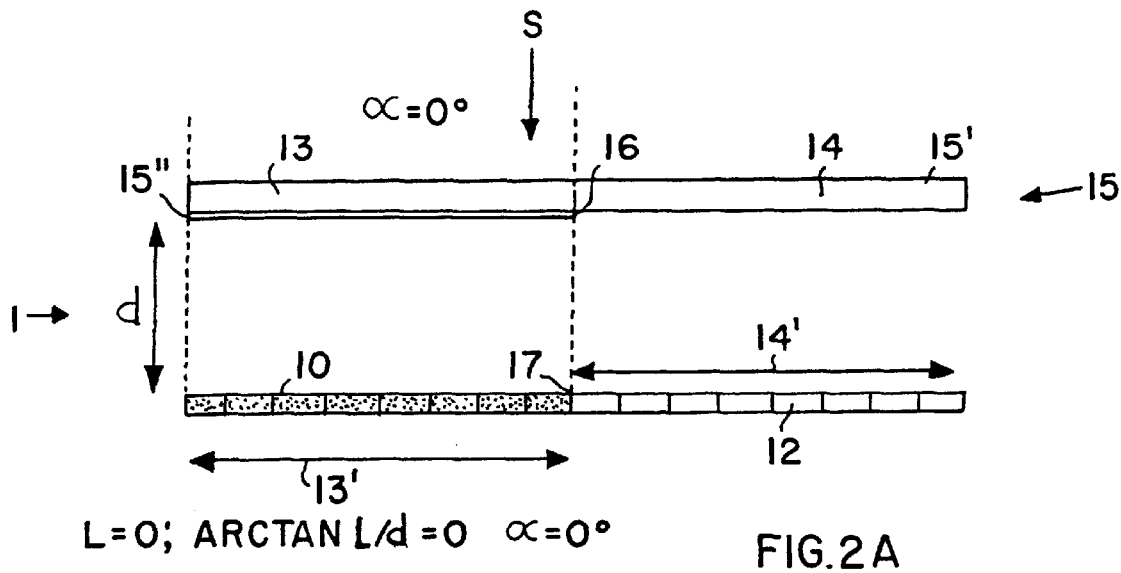
FIG. 2A is a schematic sectional side view of the sun sensor of FIG. 1, in the case of a perpendicular or perfectly vertical incidence of sunlight.
Figure 2B:
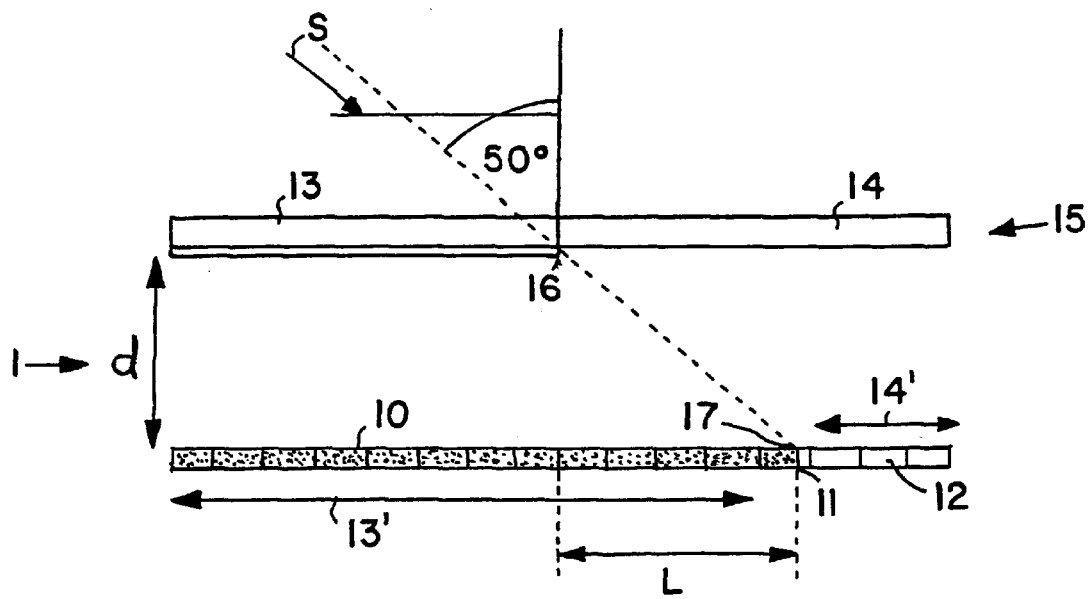
FIG. 2B is a sectional side view similar to that of FIG. 2A, but showing the case of sunlight incident at a sloping angle of incidence a $\alpha=50°$.

FIG. 1 further in combination with FIGS. 2A and 2B show two different particular situations, i.e. different angles of incidence. In each situation, respectively, the completely shaded light sensitive elements 10 are entirely within the shaded region 13', i.e. the region in the shadow of the non-transparent region 13 of the shadow mask 15, for the particular incidence angle situation. The completely illuminated light sensitive elements 12, in each situation, are entirely within the illuminated region 14', i.e. the region illuminated by the sunlight projected through the transparent region 14 of the shadow mask 15. The shadow boundary 17 projected from the linear boundary or edge 16 of the shadow mask 15 is the boundary between the shaded region 13' and the illuminated region 14', and falls on and intersects the partially illuminated and partially shaded light sensitive element 11.

In the case of perpendicular or normal incidence of light onto the photosensitive array 9 as shown in FIG. 2A, whereby the incidence angle α=0°, half of the light sensitive elements, namely eight light sensitive elements 10, are in the shaded region 13', while the other half, i.e. the other eight light sensitive elements 12, are entirely in the illuminated region 14'. The shadow boundary 17 projected from the linear edge 16 of the shadow mask 15 falls exactly between the eight completely shaded light sensitive elements 10 and the eight completely illuminated light sensitive elements 12, such that there is no partially shaded light sensitive element 11 in this particular ideal case of perpendicular incident light.

A different light incidence example is shown in FIG. 2B, whereby the incident sunlight falls onto the device at a sloping angle, particularly with an angle of incidence α=50°. In this case, twelve light sensitive elements 10 are completely shaded within the shaded region 13', while three light sensitive elements 12 are completely illuminated in the illuminated region 14', and one light sensitive element 11 is partially illuminated and partially shaded. Thus, the shadow boundary 17 falls on and cuts across the partially illuminated and partially shaded light sensitive element 11, at a location spaced by a spacing distance L away from the center 9' of the array 9, which also corresponds to the location of the linear edge 16 between the non-transparent region 13 and the transparent region 14 of the shadow mask 15.

In order to determine the angle of incidence α at which the sunlight S is incident on the sun sensor 1, the sun sensor 1 includes first means M1 receiving the respective output signals of the light sensitive elements 10, 11 and 12. The first means M1 are adapted to determine how many of the elements are completely shaded, i.e. the number of completely shaded light sensitive elements 10, as well as the fractional shading portion of the partially shaded light sensitive element 11. These determinations are carried out in particular as will be described below in connection with an example. The sun sensor 1 further includes second means M2 that are adapted to determine or calculate the angle of incidence α from the information provided by the first means.

Using these first and second means M1 and M2, the sun sensor 1 carries out the angle determination in two steps, or with two partial determinations, namely a coarse determination based on the number of completely shaded light sensitive elements 10 and a fine determination based on the fractional shading portion of the partially shaded light sensitive element 11. In this context, the coarse determination is preferably carried out quasidigitally, while the fine determination is preferably carried out by an analog interpolation step. These determinations can be carried out in any conventional hardware and/or software able to carry out the necessary functions, for example including components of the prior art systems discussed above herein. These determinations are preferably carried out in a microprocessor that embodies the first and second means, and that may, for example, be a microprocessor or particularly a central processor of the built-in main computer of a spacecraft such as a satellite or the like.

As mentioned above, the first means M1 determines the number of completely shaded light sensitive elements 10 in a digital or quasi-digital manner. For example, the first means M1 simply receives the output signal from each light sensitive element 10, 11 and 12, compares the signal level of the output signal to at least one threshold, and determines that each light sensitive element providing an output signal below the specified threshold is completely shaded. Further, each light sensitive element providing an output signal having a signal level above a specified high threshold can be determined to be a fully illuminated light sensitive element 12. The partially illuminated and partially shaded light sensitive element 11 can be identified by its output signal having a signal level falling between a low threshold and a high threshold, or simply by its location between a group of consecutive light sensitive elements having a low signal, i.e. the shaded elements 10, and a group of consecutive light sensitive elements having a high output signal, i.e. the illuminated elements 12.

The inventive arrangement may further optionally provide a way of avoiding defects. If any particular light sensitive element within a group of completely shaded elements or completely illuminated elements provides an output signal that is significantly different from the output signals of its two immediately neighboring light sensitive elements within the respective group, then this suspect light sensitive element is deemed to be defective, and counted among the light sensitive elements defined by the two immediately neighboring elements regardless of its actual signal output. For example, if an element that is neighbored on both sides by fully illuminated elements 12 itself has an output signal that is below the low signal threshold, the first means M1 assumes that this element is a defective element, and counts it as a fully illuminated element 12 despite its low output signal.

As also mentioned above, the first means M1 determines the fractional shading portion of the partially shaded and partially illuminated light sensitive element 11 based on an analog interpolation. For example, the first means M1 compares the output signal level of the partially shaded element 11 respectively with the output signal levels of the completely shaded element 10 and the completely illuminated element 12 that are immediately adjacent to the partially shaded element 11 on the two opposite sides thereof. The fractional relationship of the output signal levels is taken as corresponding to the fractional shading portion of the partially shaded element 11. For example, if the output signal level of the partially shaded element 11 is greater than the output signal level of the completely shaded element 10 by an amount equal to ⅓ of the difference between the respective signal levels of the completely illuminated element 12 and the completely shaded element 10, then it is thereby determined that the partially shaded element 11 is ⅓ illuminated and ⅔ shaded. This analog interpolation also directly takes into account a dark current correction, based on the dark current output signal of the completely shaded element. The dark current correction improves the accuracy of the determination, and is automatically taken into account by considering the difference in output signal levels of the completely shaded element and the completely illuminated element.

Once the number of completely shaded elements 10 as well as the fractional shading portion of the partially shaded element 11 have been determined, the angle of incidence a of the incident sunlight S can then be determined as follows. First, it is necessary to calculate the spacing L of the shadow boundary 17 from the center point 9' of the photosensitive array 9 of light sensitive elements 10, 11 and 12. This spacing or distance L as shown in FIG. 2B, is calculated as follows:

$$L = (n_s - n/2 + 1 - A_p/A_i) \times l \qquad \text{Equation (1)}$$

wherein $n_s$ = number of completely shaded light sensitive elements 10;

n = total number of all light sensitive elements 10, 11, and 12;

$A_p$ = output signal level of the partially shaded light sensitive element 11;

$A_i$ = output signal level of the completely illuminated light sensitive element 12 neighboring the element 11; and l = length of one light sensitive element in the first linear direction in which the array 9 extends.

In the above equation, the fraction $A_p/A_i$ represents the fractional portion of the light sensitive element 11 that is illuminated, while the expression $1 - A_p/A_i$ represents the fractional portion of the light sensitive element 11 that is shaded.

Once the spacing or length L has been determined, a simple trigonometric calculation or data table look-up allows the angle of incidence α to be determined as:

$$\alpha = \arctan L/d \qquad \text{Equation (2)}$$

wherein d is the spacing distance of the shadow mask 15 above the photosensitive array 9, as described above.

In order to ensure and maintain a high accuracy and precision of the determination of the incidence angle, two important preconditions must be satisfied. First, the photocurrent generated per unit of light input power and per surface area of the light sensitive elements 10, 11 and 12 must be uniform or equal at all points or locations on the light sensitive surface area of all the light sensitive elements, i.e. it cannot be dependent on the particular location. Secondly, the photocurrent generated by the light sensitive elements 10, 11 and 12 must be proportional to the absorbed light input power, either with or without carrying out a dark current correction as described herein. The overall accuracy and precision with which the incidence angle α can be determined is directly affected by the extent to which these two pre-conditions are satisfied. While the present device can use light sensitive elements that are known to have a certain variation of the generated photocurrent at different locations across the surface area of the light sensitive elements, it must be understood that the precision and accuracy of the resulting angle determination will consequently be affected.

In the example illustrated in FIG. 2A, the sun is positioned exactly above and normal to the sun sensor 1 and particularly the plane of the photosensitive array 9, whereby the incidence angle α=0°. As a result, eight light sensitive elements 10 are completely shaded, while the remaining eight light sensitive elements 12 are completely illuminated with the maximum sun intensity so that they output the maximum intensity output signal $A_0$. In this case, the evaluation of the above Equation (1) would proceed, for example, on the basis of eight completely shaded light sensitive elements 10, seven completely illuminated light sensitive elements 12, and one partially illuminated light sensitive element 11 between the elements 10 and 12, whereby the "partially illuminated" element 11 is actually 100% illuminated and 0% shaded. Thus, $A_p = A_i = A_0$. As a result, the above Equation (1) gives L=0, such that arctan L/d=0 gives α=0°. The evaluation using the partially illuminated element 11 can be omitted, if the first means determines that there is no partially illuminated element 11, namely that all of the elements have an output signal that is either below a low threshold or above a high threshold. In such a case the calculation of L is carried out simply based on the number of completely shaded light sensitive elements.

If the position of the sun relative to the sun sensor 1 now changes by the angle β in a plane along the linear edge 16 between the non-transparent region 13 and the transparent region of the shadow mask 15, while maintaining the same angle α=0° in a plane along the first linear direction of extension of the linear photosensitive array 9, whereby the angle β lies in a plane perpendicular to that of the angle α, there is no change in the above described evaluation. Namely, the output intensity of the completely illuminated light sensitive elements 12 will then be given by $A_i = A_0 \times \cos \beta$, which uniformly affects all of the completely illuminated elements 12. As can be seen in the above Equation (1), and the above described evaluation, this has no effect on the angle determination. Thus, the sun sensor 1 according to FIGS. 1, 2A and 2B is not suitable for determining the angle of incidence β, which also means that the sensor is not sensitive to variations in β so that the angle of incidence a can be properly determined without regard to β.

In the example shown in FIG. 2B, the incident sunlight S is incident on the sun sensor 1 at an angle α=50° in the plane of the first linear direction in which the linear photosensitive array 9 extends. As a result, in this example, four additional light sensitive elements 10 are completely shaded relative to the above described example of FIG. 2A, the next light sensitive element 11 is partially shaded, and only three light sensitive elements 12 remain completely illuminated. If the angle of incidence β in the perpendicular plane is 0, then the intensity of radiation on the fully illuminated elements 12 is given by $A_i=A_0 \times \cos 50°$. The partially illuminated element 11 provides an output signal of $A_p=0.767 \times A_0 \times \cos 50°$. Applying these values in the above Equation (1) and then solving Equation (2) gives α=50°. If the position of the sun relative to the sun sensor 1 then moves in the plane perpendicular to the first linear direction, i.e. along the non-sensitive plane, to give an angle of incidence β other than 0, the ratio of $A_p/A_i$ emains the same, and thus the calculated angle of incidence a remains the same independent of the angle β.

Figure 3:
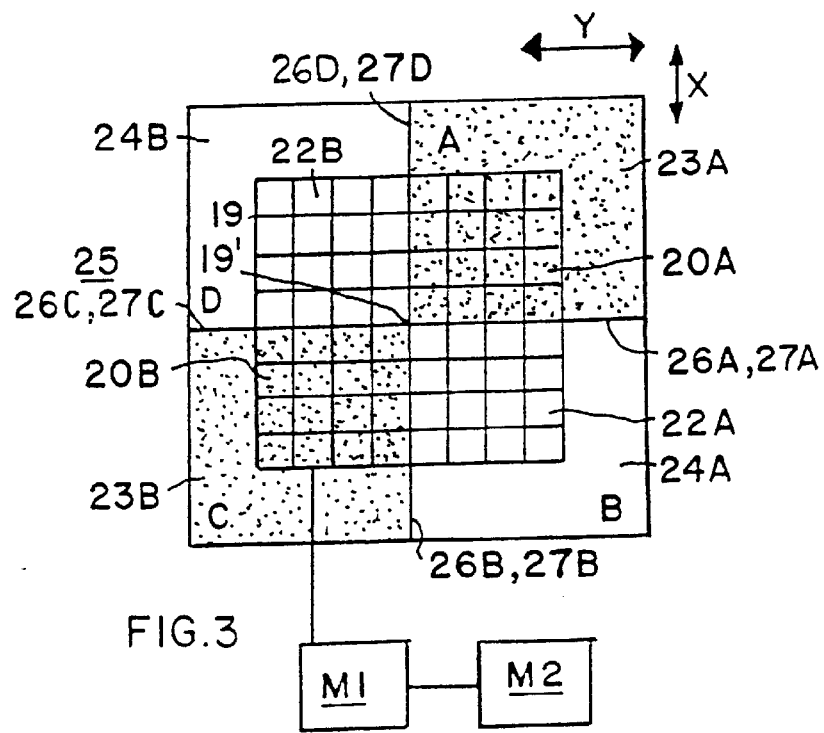
FIG. 3 is a schematic top plan view of an arrangement for determining the angle of incidence of incident radiation in two directions, namely a two-dimensional sun sensor, according to a second example of the invention.

FIG. 3 is a schematic top plan view of a two-dimensional sun sensor 2 which is adapted to determine the angle of incidence α and the angle of incidence β of the solar radiation S in two perpendicular planes. For this purpose, the sun sensor 2 comprises a two-dimensional photosensitive array 19 of a plurality of light sensitive elements 20A, 20B, 22A, and 22B, which are arranged adjacent to one another and which extend rectilinearly in a first linear direction and a second linear direction. The light sensitive elements 20A, 20B, 22A, and 22B each respectively have a right-angled shape, and particularly a quadrilateral shape, and most particularly a square shape. The elements are arranged directly contiguous and adjacent one another, and are preferably embodied in a single monolithic two-dimensional detector array. In the present illustrated example, the number m and the number n of light sensitive elements 20A, 20B, 22A, and 22B extending respectively in the first linear direction and in the second linear direction are each eight, i.e. the two-dimensional array 19 is an eight-by-eight array, so that a total of sixty-four light sensitive elements are involved.

A shadow mask 25 is arranged at a spacing d above or in front of the light sensitive elements 20A, 20B, 22A, and 22B, whereby this shadow mask 25 includes two transparent regions 24A and 24B and two non-transparent regions 23A and 23B. The non-transparent region 23A, the transparent region 24A, the non-transparent region 23B, and the transparent region 24B are respectively arranged in an alternating checkerboard fashion so as to form respectively alternating transparent and non-transparent quadrants A, B, C, and D. These quadrants, and the respective corresponding transparent or non-transparent regions of the shadow mask 25, are separated from each other by a first linear boundary or edge 26A and 26C extending parallel to the first linear direction, and a second linear boundary or edge 26B and 26D extending parallel to the second linear direction, such that the two linear boundaries intersect each other at a right angle at an intersection point lying directly above the center 19' of the two-dimensional photosensitive array 19.

The light sensitive elements 20A, 20B, 22A, and 22B are selectively shaded by the shadow mask 25 depending on the angles of incidence α and β of the incident sunlight S in two perpendicular planes, and thereby the light sensitive elements respectively generate output signals corresponding to the angles of incidence α and β. In other words, the two non-transparent regions 23A and 23B correspondingly form two shaded regions 23A' and 23B' while the transparent regions 24A and 24B form two illuminated regions 24A' and 24B', whereby the shaded regions and illuminated regions are separated from each other by shadow boundaries 27A, 27B, 27C, and 27D corresponding to the projections of the linear boundaries or edges 26A, 26B, 26C and 26D of the shadow mask 25. The light sensitive elements 20A and 20B located generally under the first quadrant A and the third quadrant C lie in the shaded regions up to the location of the shadow boundaries 27A, 27B, 27C, and 27D, while the remaining light sensitive elements 22A and 22B located generally under the second quadrant B and the fourth quadrant D lie in the illuminated regions 24A' and 24B' up to the shadow boundaries.

In order to determine the two angles of incidence α and β of the incident sunlight S, the sun sensor 2 includes first means M1 for receiving the output signals of the light sensitive elements 20A, 20B, 22A, and 22B. This first means is adapted to determine the number and the position of the respective light sensitive elements 20A and 20B lying in the shaded regions 23A' and 23B', as well as the fractional shading portion and the position of the partially shaded light sensitive elements bordering on the completely shaded light sensitive elements 20A and 20B. However, in the example shown in FIG. 3, the sunlight S falls in a normal direction onto the sun sensor 2, so that the angles α and β are both zero, and there are no partially shaded light sensitive elements.

The sun sensor 2 further comprises second means M2 adapted to determine the two angles of incidence α and β of the incident sunlight S in two dimensions or two planes, based on the information provided by the first means. This determination of the two angles of incidence α and β is carried out by evaluations and calculations in the same manner as has already been described above in connection with the first example embodiment of FIGS. 1, 2A, and 2B for determining the angle of incidence α. In other words, each incidence angle α and β can be separately and independently determined using the same evaluation and calculation as described above in connection with the angle of incidence α. While the computational effort is thus increased, the complexity or difficulty is not increased, because the same steps as described above simply need to be carried out independently for the two different angles α and β.

Once again, as described above, the determination of the number of completely shaded light sensitive elements is carried out digitally or quasi-digitally, by determining which output signals fall below a low threshold and which output signals fall above a high threshold. The determination of the position of the respective elements is carried out simply by storing an address or the like corresponding to the position of each particular light sensitive element, and then associating the proper location address with the output signal of that element. In other words, the position of each light sensitive element is known or can be established initially at the time of manufacturing the sun sensor, and then it is a simple matter to identify which locations are associated with shaded output signals in any given situation.

The determination of the fractional shading portion of the partially shaded light sensitive elements is once again carried out based on the output signals of one or more of the completely illuminated light sensitive elements 22A and 22B and of one or more of the completely shaded light sensitive elements 20A and 20B, directly neighboring the partially shaded elements of interest. This determination is carried out by an analog interpolation as already described above in connection with the first embodiment. Once again in this embodiment, a dark current correction is carried out based on the output signals of the completely shaded light sensitive elements 20A and 20B in order to improve the accuracy of the determination of the fractional shading portion.

An even simpler embodiment of a two-dimensional sun sensor is not shown, but essentially consists of two of the above described first embodiment sun sensors 1 arranged perpendicularly to each other. With such an arrangement, one of the sun sensors 1 can be used for determining the angle of incidence α in a first plane, and the other one of the sun sensors 1 can be used for determining the angle of incidence R in a second plane perpendicular to the first plane.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An arrangement for determining an angle of incidence of incident light relative to said arrangement, comprising:
   a first array of at least three light sensitive elements arranged successively one after another along a first linear direction, wherein each respective one of said elements has an output adapted to provide a respective output signal responsive to light impinging on said respective element,
   a shadow mask that is arranged at a spacing (d) away from said array in a path of the incident light, and that includes a transparent region and a non-transparent region with a linear mask boundary therebetween, wherein said linear mask boundary extends along a plane perpendicular to said first linear direction, wherein the incident light is incident on said shadow mask such that said non-transparent region casts a shaded region onto said array, said incident light passing through said transparent region projects an illuminated region onto said array, and said incident light passing by said linear mask boundary projects a shadow boundary onto said array between said shaded region and said illuminated region, wherein a position of said shaded region, said shadow boundary and said illuminated region on said array varies responsive to said angle of incidence, and wherein one or more of said elements are completely shaded elements lying completely in said shaded region, one or more of said elements are completely illuminated elements lying completely in said illuminated region, and one of said elements is a boundary element located between said one or more completely shaded elements and said one or more completely illuminated elements,
   first means connected to said outputs of said light sensitive elements and adapted to receive said output signals, and from said output signals determine a number of said one or more completely shaded elements and a fractional shading portion of said boundary element that is within said shaded region, and
   second means connected to said first means and adapted to determine said angle of incidence from said number of said one or more completely shaded elements, said fractional shading portion, and said spacing (d).

2. The arrangement according to claim 1, wherein said shadow mask is arranged such that said mask boundary is positioned perpendicularly spaced from a center of said array.

3. The arrangement according to claim 1, wherein said array is a linear array of said elements arranged in a single row along said first linear direction.

4. The arrangement according to claim 1, wherein each said light sensitive element respectively has a quadrilateral plan shape.

5. The arrangement according to claim 1, wherein said light sensitive elements are arranged directly contiguous with one another in said first linear direction.

6. The arrangement according to claim 1, wherein said array is a single monolithic photodetector array having said elements embodied therein.

7. The arrangement according to claim 1, wherein said array has a total of exactly eight or a whole number multiple of eight of said elements.

8. The arrangement according to claim 1, further comprising a second array of a plurality of second light sensitive elements, wherein said second array is arranged parallel and adjacent to said first array such that said shaded region, said shadow boundary, and said illuminated region will fall onto said second array simultaneously with said first array, wherein said second elements respectively have second outputs that are separately connected to said first means, and wherein said first means is adapted to evaluate output signals provided by said second elements independently of said output signals of said elements of said first array.

9. The arrangement according to claim 1, wherein said first means includes means for determining said fractional shading portion of said boundary element from said output signal of said boundary element, said output signal of one of said completely shaded elements directly adjacent to said boundary element and said output signal of one of said completely illuminated elements directly adjacent to said boundary element.

10. The arrangement according to claim 9, wherein said means for determining said fractional shading portion includes means for carrying out a dark current correction of said output signal of said boundary element based on said output signal of said one completely shaded element directly adjacent to said boundary element.

11. The arrangement according to claim 1, wherein said first means includes a digital comparator for comparing each said output signal to a low threshold value for determining said number of said one or more completely shaded elements, and an analog interpolator for interpolating said output signal of said boundary element between said output signal of one of said completely shaded elements and said output signal of one of said completely illuminated elements, and wherein said second means includes a calculation module that is adapted to calculate a length (L) between said shadow boundary and a location on said first array located perpendicularly below said mask boundary, based on said number and said fractional shading portions and that is adapted to evaluate a trigonometric function involving said length (L) and said spacing (d) to determine said angle of incidence.

12. The arrangement according to claim 1, wherein each said light sensitive element has a light sensitive surface area with a uniform photocurrent generation over the entirety thereof, and wherein said photocurrent generation is linearly proportional to the incident power of light impinging thereon.

13. A combination of a first and a second said arrangement according to claim 1, for determining a first said angle of incidence (α) in a first plane and a second said angle of incidence (β) in a second plane perpendicular to said first plane, wherein said first and second arrangements are so oriented relative to each other such that said first linear direction of said first arrangement is perpendicular to said first linear direction of said second arrangement.

14. An arrangement for determining a first angle of incidence (α) in a first plane and a second angle of incidence (β) in a second plane perpendicular to said first plane, of incident light relative to said arrangement, comprising:
- an array of at least three respective light sensitive elements arranged successively one after another respectively along each one of mutually perpendicular first and second linear directions, wherein each respective one of said elements has an output adapted to provide a respective output signal responsive to light impinging on said respective element,
- a shadow mask that is arranged at a spacing (d) away from said array in a path of the incident light, and that includes two transparent quadrants and two non-transparent quadrants arranged alternatingly adjacent one another along said first and second directions in a checkerboard pattern, wherein said non-transparent quadrants are respectively separated from said transparent quadrants by a first linear mask boundary parallel to said first linear direction and a second linear mask boundary parallel to said second linear direction, wherein the incident light is incident on said shadow mask such that said two non-transparent quadrants cast two shaded regions respectively onto said array, the incident light passing through said two transparent quadrants projects two illuminated regions respectively onto said array, and the incident light passing by said first and second linear mask boundaries projects first and second shadow boundaries respectively onto said array between said shaded regions and said illuminated regions, wherein a position of said shaded regions, said shadow boundaries, and said illuminated regions on said array varies responsive to said first and second angles of incidence, and wherein some of said elements are completely shaded elements lying completely in said shaded regions, some of said elements are completely illuminated elements lying completely in said illuminated regions, and some of said elements are boundary elements located between said completely shaded elements and said completely illuminated elements,
- first means connected to said outputs of said light sensitive elements and adapted to receive said output signals, and from said output signals determine numbers and locations of said completely shaded elements, locations of said boundary elements, and fractional shading portions of said boundary elements that are within said shaded regions, and
- second means connected to said first means and adapted to determine said first and second angles of incidence from said numbers and said locations of said completely shaded elements, said locations and said fractional shading portions of said boundary elements, and said spacing (d).

15. The arrangement according to claim 14, wherein said first and second linear mask boundaries intersect each other perpendicularly at an intersection point that is perpendicularly spaced from a center of said array.

16. The arrangement according to claim 14, wherein said array is a two-dimensional planar array of said elements arranged in a rectilinear grid pattern of rows and columns respectively extending in said first and second linear directions.

17. The arrangement according to claim 14, wherein each said light sensitive element respectively has a quadrilateral plan shape.

18. The arrangement according to claim 14, wherein said light sensitive elements are arranged directly contiguous with one another in at least one of said first and second linear directions.

19. The arrangement according to claim 14, wherein said array is a single monolithic photodetector array having said elements embodied therein.

20. The arrangement according to claim 14, wherein said array has a first number of said elements extending in said first linear direction and a second number of said elements extending in said second linear direction, and wherein said first and second numbers are each respectively exactly eight or a whole number multiple of eight.

21. The arrangement according to claim 14, wherein said first means includes means for determining said fractional shading portions of said boundary elements from said output signals of said boundary elements, said output signals of one or more of said completely shaded elements respectively directly adjacent to said boundary elements, and said output signals of one or more of said completely illuminated elements respectively directly adjacent a to said boundary elements.

22. The arrangement according to claim 21, wherein said means for determining said fractional shading portions includes means for carrying out a dark current correction of said output signals of said boundary elements based on said output signals of said one or more completely shaded elements directly adjacent to said boundary elements.

23. A method of determining an angle of incidence of incident light falling on a detector arrangement including an array of at least three consecutively arranged light sensitive elements, and a shadow mask that has a transparent region, a non-transparent region, and a linear mask boundary therebetween and that is arranged at a spacing (d) away from said array in a path of said incident light, wherein said method comprises the following steps:
- a) allowing said incident light to fall on said detector arrangement so that said non-transparent region casts a shadow forming a shaded region on said array, said incident light passing through said transparent region projects an illuminated region on said array, and said incident light passing by said linear mask boundary projects a shadow boundary on said array between said shaded region and said illuminated region, wherein one or more of said elements are completely shaded elements lying completely within said shaded region, one or more of said elements are completely illuminated elements lying completely within said illuminated region, and one of said elements is a boundary element located between said shaded elements and said illuminated elements, dependent on and responsive to an angle of incidence of said incident light relative to said detector arrangement;
- b) evaluating respective output signals from all of said elements to determine a number of said completely shaded elements;
- c) evaluating respective output signals at least from said boundary element and from at least one of said completely illuminated elements for determining a fractional shading portion of said boundary element that lies within said shaded region;
- d) calculating a reference length (L) along said array to a point at which said shadow boundary crosses said array, using said number and said fractional shading portion; and e) calculating said angle of incidence using said reference length (L) and said spacing (d) to solve a trigonometric function.

24. The method according to claim 23, wherein said step b) comprises respectively comparing signal levels of said output signals to a low threshold and to a high threshold, and evaluating a respective one of said output signals as an output signal of one of said shaded elements when said signal level of said respective output signal is below said low threshold, and evaluating a respective one of said output signals as an output signal of one of said illuminated elements when said signal level of said respective output signal is above said high threshold.

25. The method according to claim 23, wherein said step c) further comprises evaluating a respective output signal from at least one of said completely shaded elements for determining said fractional shading portion.

26. The method according to claim 25, wherein said step c) comprises using said output signal from said at least one completely shaded element for carrying out a dark current correction of said output signal level of said boundary element.

27. The method according to claim 25, wherein said step c) comprises carrying out an analog interpolation of a signal level of said output signal of said boundary element between respective signal levels of said output signals of said at least one shaded element and said at least one illuminated element.

28. The method according to claim 25, wherein said step c) comprises evaluating respective output signals from said boundary element, from a respective one of said shaded elements directly adjacent to said boundary element, and from a respective one of said illuminated elements directly adjacent to said boundary element.

* * * * *

UNITED STATES PATENT AND TRADEMARK OFFICE
CERTIFICATE OF CORRECTION

PATENT NO. : 6,274,862 B1
DATED : August 14, 2001
INVENTOR(S) : Rieger

It is certified that error appears in the above-identified patent and that said Letters Patent is hereby corrected as shown below:

Column 9,
Line 41, after "incidence", replace "a" by -- $\alpha$ --;

Column 10,
Line 56, after "region", insert -- 14 --;

Column 11,
Line 2, after "incidence", replace "a" by -- $\alpha$ --;
Line 22, after "incidence", replace "a" by -- $\alpha$ --;

Column 13,
Line 16, after "incidence", replace "R" by -- $\beta$ --;

Column 14,
Line 56, after "shading", replace "portions" by -- portion, --.

Signed and Sealed this

Ninth Day of April, 2002

Attest:

*Attesting Officer*

JAMES E. ROGAN
*Director of the United States Patent and Trademark Office*